United States Patent [19]

Bradley et al.

[11] Patent Number: 4,909,687
[45] Date of Patent: Mar. 20, 1990

[54] BLIND RIVET

[75] Inventors: William D. Bradley; Michael Woodrow, both of Welwyn Garden City; Raymond D. Lacey, Essendon, all of England

[73] Assignee: Avdel Systems Limited, a British Company, Hertfordshire, England

[21] Appl. No.: 357,713

[22] Filed: May 26, 1989

[30] Foreign Application Priority Data

May 27, 1988 [GB] United Kingdom ............... 8812599

[51] Int. Cl.4 ............................................. F16B 13/04
[52] U.S. Cl. ........................................ 411/43; 411/70
[58] Field of Search ................ 411/43, 34, 70, 35, 411/36, 37, 38, 39, 41, 32, 33, 40, 44, 56

[56] References Cited

U.S. PATENT DOCUMENTS 2,501,567  3/1950  Huck .................................. 411/70 X
3,136,204  6/1964  Reynolds ............................ 411/70
3,515,028  6/1970  Patton ................................ 411/70
4,620,825  11/1986 Potzas ............................... 411/34
4,736,560  4/1988  Murphy ............................. 411/43 X Primary Examiner—Rodney M. Lindsey
Attorney, Agent, or Firm—Oblon, Spivak, McClelland, Maier & Neustadt

[57] ABSTRACT

A blind rivet able to be anchored in material such as softwood, without the need to break through the blind face of the material, comprises a tubular shell and a stem which extends through the shell. The shell has a preformed heat at one end of a shank. An end portion of the shank remote from the head has a thinner wall than the main, next adjacent, portion of the shank, and is thus weakened and made more easily expandible. The stem has a plugging portion having an expander head adjacent the thin-walled end portion of the shell, a breakneck, and a pulling portion which projects from the head end of the shell. The expander head increases in diameter away from the pulling portion, and presents a plurality of longitudinal cutting elements generally towards the weakened end portion of the shell. On gripping the pulling portion and pulling the stem, the cutting elements split the end portion of the shell into a plurality of legs, while the expander head enters into the end portion and forces the legs outwardly. The main part of the shank has a smaller diameter bore than the weakened end portion, and resists entry of the expander head.

13 Claims, 3 Drawing Sheets

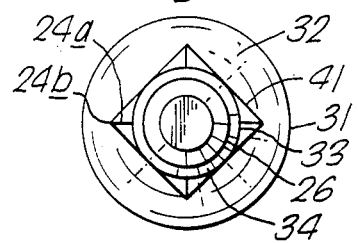
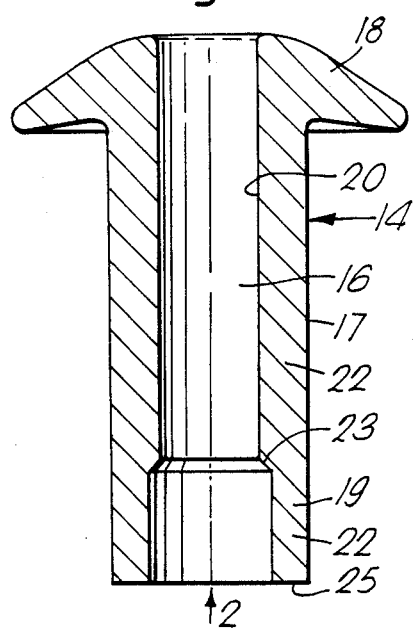
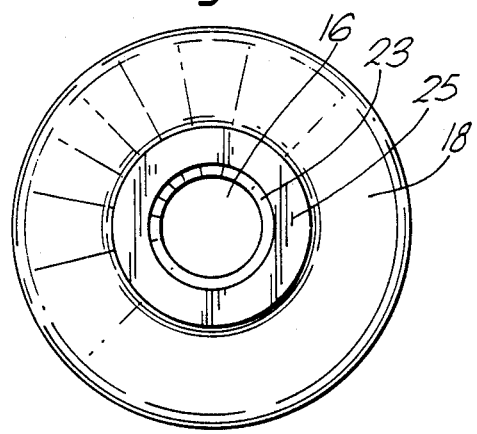
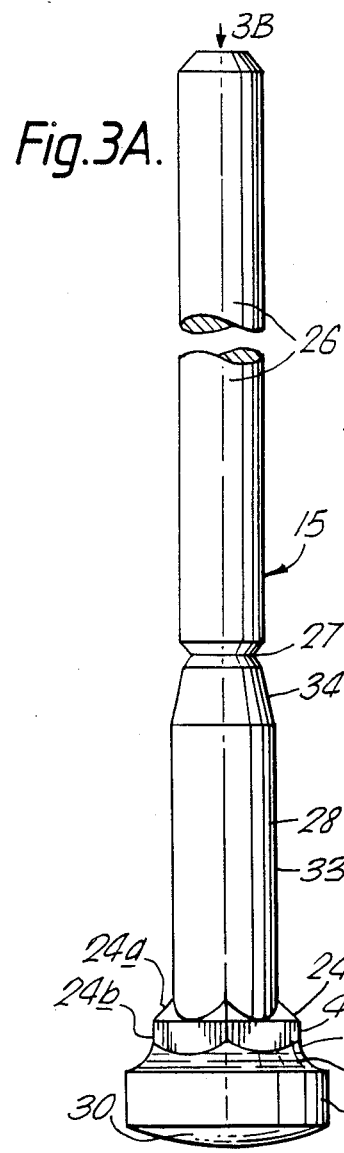

BLIND RIVET

The invention relates to a blind rivet, and in particular to a blind rivet for anchoring in a relatively soft material, for example softwood.

Blind rivets, which are installed or place by access to one side only of the workpieces, have been known and used for many years for use in applications in which the rivet protrudes from the blind or inaccessible side of two or more superposed sheets, and forms a blind head behind the blind face of the rear sheet. However there is also a requirement to secure a member to a body of relatively soft material, e.g. softwood, in such a way that neither the rivet, nor the hole in which it is inserted, breaks through the blind face of the body of relatively soft material.

Such an application raises different problems. The enlarged blind head must be formed by the rivet, inside the body of relatively soft material, in such a way that the engagement of the blind head within the material is sufficiently strong to resist pull-out.

The invention provides, in one of its aspects, a blind rivet for anchoring in relatively soft material, which rivet comprises a tubular shell and a stem;

the tubular shell having a shank, and a preformed head at one end of the shank, and a weakened expandible portion of the shank at the end thereof remote from the head, the weakened portion of the shell having a thinner wall than the next adjacent portion of the shell;

the stem extending through the tubular shell, the stem having an expander head adjacent the expandible portion of the shell, the expander head having a maximum external diameter greater than the internal diameter of the thinner wall portion of the shell; the stem having a plurality of cutting elements on that side of the head which faces towards the weakened portion of the shell; at least part of the head increasing in diametral dimension towards the maximum diameter of the head; and a breakneck on the stem;

such that, when the rivet is inserted into a bore in a body of relatively soft material so that the expandible portion of the shell is located in the bore by a sufficient distance from the surface of the material at the accessible end of the bore, and increasing tension is applied to the stem on the side of the breakneck remote from the stem head, with respect to the head of the shell, firstly the stem head progressively enters the weakened portion of the shell, the cutting elements causing the weakened portion of the shell to split into a plurality of legs, the progressively increasing diametral dimension of the head causing the legs to be forced outwardly into the body of relatively soft material to anchor the rivet therein, and thereafter the stem breakneck fractures before the stem head can advance substantially further into the shell beyond the weakened portion, thereby confining the splitting of the shell into radially expanded legs embedded in the material to the end portion of the shell spaced away from the surface of the material at the accessible end of the bore, with no substantial expansion of at least the major part of the remaining length of the shell shank.

A specific embodiment of the invention will now be described by way of example and with reference to the accompanying drawings, in which:

FIG. 1 is a longitudinal axial section through a rivet shell before assembly;

FIG. 2 is a tail end elevation of the shell in the direction of the arrow 2 in FIG. 1;

FIG. 3A is an external elevation of the rivet stem before assembly;

FIG. 3B is an end elevation of the stem in the direction of the arrow 3B in FIG. 3A;

Figure 6:
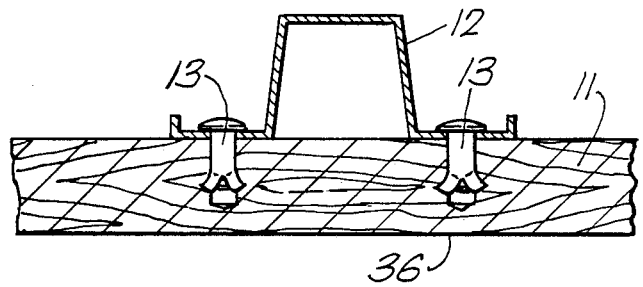
FIG. 6 illustrates two rivets used to secure a softwood panel to a frame-member.

Referring first to FIG. 6, a softwood panel 11 is secured to a metal channel-section frame member 12 by means of a number of rivets, two of which are shown, after placing, at 13. It is a requirement that the face 36 of the softwood panel 11 which is remote from the frame member 12 is not distorted or broken by the riveting operation.

The rivet of this example comprises a shell 14 and a stem 15, both of steel. FIGS. 1 and 2 show the shell, which is tubular with a bore 16 completely through it, and comprises a shank 17 having a preformed head 18 at one end and a weakened portion 19 at the other, or tail, end. The external diameter of the shank is uniform, the weakened portion 19 having a thinner wall 21 than that 22 of the remainder, or main part, of the shank which is adjacent to it. The weakened portion meets the remainder of the shank in an annular sloping shoulder 23. The axial extent of the weakened portion 19 is between one quarter and one third of the total length of shell shank 14 excluding the head 18.

The stem 15 is shown in FIG. 3 and comprises a pulling portion 26 joined by a breakneck 27 to a plugging portion 28. At the end of the stem remote from the pulling portion 26 is an expander head 29. The pulling portion 26 has a uniform diameter which is a close sliding fit in the shell bore 16. The major part of the length of the plugging portion 28 comprises a retaining portion 33 which is of uniform diameter slightly greater (in this example, by about 0.13 mm in a diameter of about 2.6 mm) than the uniform internal diameter of the major length part 20 of the shell bore 16. One end of the retaining portion 33 is joined to the breakneck 27 by a taper 34.

The head is provided with a plurality of cutting elements in the form of four sharp edges 24, each extending generally longitudinally of the stem and spaced equally at ninety degrees apart around the stem. Each cutting edge 24 is provided at the corner of a square sectioned part 41 of the head. The dimension of each side of the square is equal to the diameter of the portion 33 of the stem. Each cutting edge 24 comprises two parts, a leading part 24a which slopes outwardly (from the periphery of the end of the stem portion 33 to a corner of the square section 41), and a trailing part 24b which extends parallel to the stem axis. The diameter across the narrow end of the sloping cutting edges 24a is less than the internal diameter of the weakened portion 19 of the shell, whereas the diameter across the wider end, and across the parts 24b, is greater than that internal diameter. Next to the square-sectioned part 41 of the head is a portion 32, the external surface of which is, in elevational section, a smooth accurate curve. The maximum external diameter of the expander head 29, over its short parallel portion 31 of uniform maximum diameter, is greater than the internal diameter of the thinner wall portion 19 of the shell and, in this example, is equal to the uniform external diameter of the shell shank 17 (see FIG. 4). Te end of the head has a slightly domed surface 30.

Figure 4:
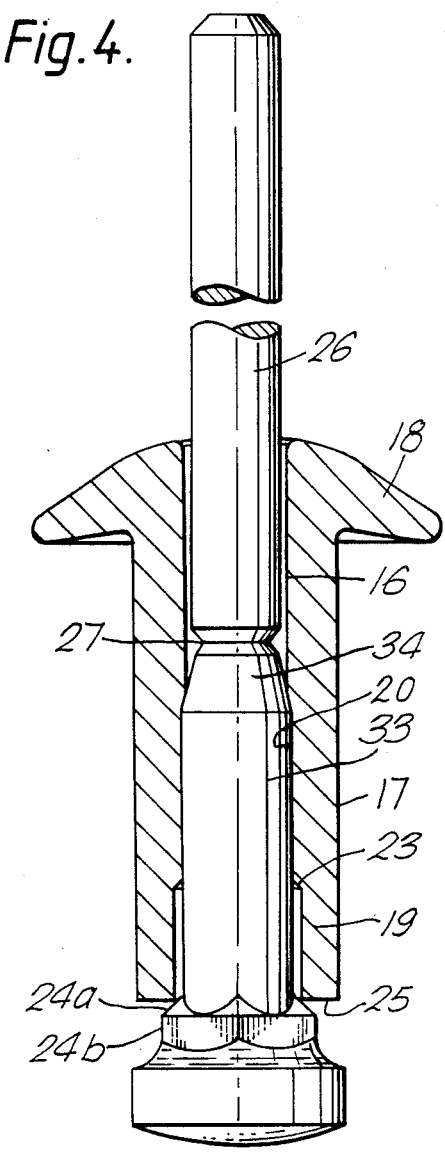
FIG. 4 shows the assembled rivet with the shell in axial section and the stem in elevation.

The assembled rivet is shown in FIG. 4, the stem having been inserted through the bore of the shell until the inner periphery of the tail end face 25 of the shell shank meets the sloping leading parts 24a of the stem cutting edges. The free end part of the pulling portion 26 of the stem projects well beyond the head 18 of the shell. The leading part of the retaining portion 33 of the stem has been drawn into about half of the length of the part 20 of the shell bore, producing an interference fit. This interference holds the stem firmly assembled in the shell. The exterior of the corresponding part of the shell shank may have been slightly expanded by this interference fit of the stem portion 33 in part of the bore 20.

Figure 5:
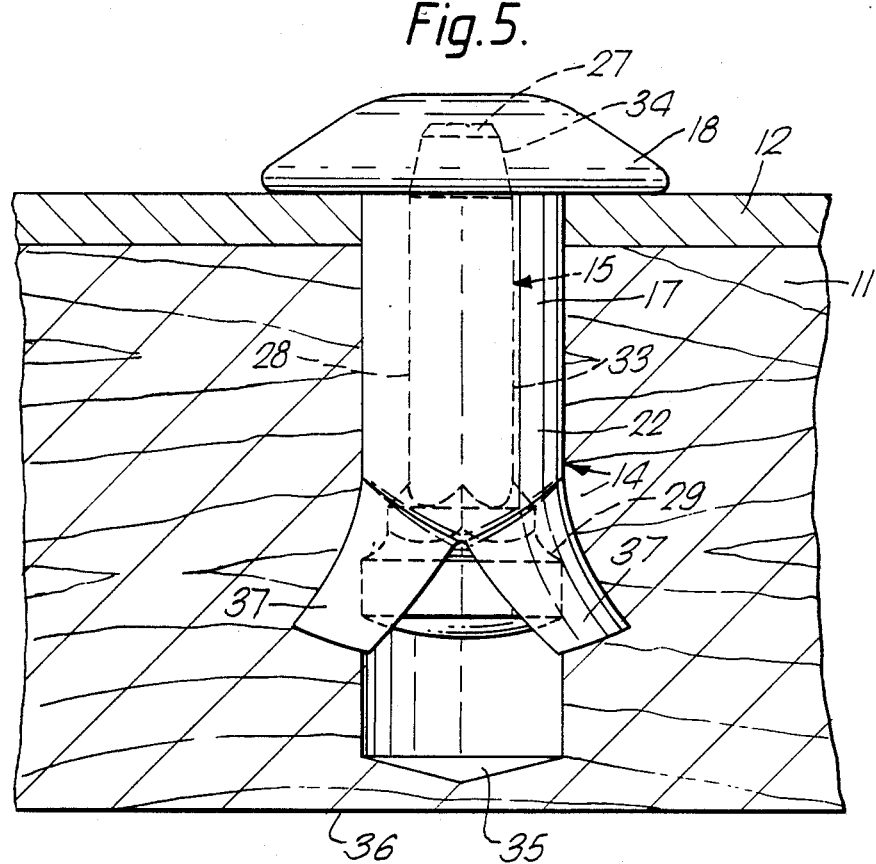
FIG. 5 is an elevation of the rivet placed in a softwood panel.

The rivet is used, in the usual way for blind rivets, by inserting the shell shank of the assembled rivet into a bore in which it is a close fit, until the underside of the head 18 abuts the near face of the workpiece or members to be joined together. FIG. 5 shows the fully placed rivet, where it will be seen that a hole 35 of appropriate diameter has been bored through the superposed frame member 12 and into the softwood panel 11. This hole should be at least long enough to accommodate the length of the assembled rivet, when the underface of the shell head 18 is pressed into contact with the near face of the frame 12. In this example, the blind end of the hole 35 comes near to, but does not break through, the remote or inaccessible face 36 of the panel 11, since it is required that this face is visually unmarked.

The rivet is placed by a blind-rivet placing tool of well-known type. This has an annular anvil which abuts the head 18 of the rivet shell, and stem-gripping and pulling jaws which grip the pulling portion of the stem and apply an increasing tension force to it with respect to the shell head. This causes the cutting edges 24 and the remainder of the stem expander head 29 to progressively enter the weakened portion 19 of the shell. The progressively increasing diametral dimensions of the leading parts 24a of the cutting edges cut into the weakened portion 19 of the shell, which ruptures along the cutting lines and splits into four legs 37. The progressively increasing diametral dimensions of the cutting edges 24a and the surface 32 of the head cause the legs to bend outwardly about their inner ends under the force of the advancing head, the legs 37 displacing and compressing the softwood material. The taper 34 on the stem eases the progressive entry of the retaining portion 33 of the stem along the bore. The slightly enlarged retaining portion 33 of the stem axially lengthens its interference fit with the wall of the shell bore. The may cause a very slight radial expansion of the outside of the shell to axially extend towards the shell head. The stem head 29 advances until resistance to the cutting edges and underhead face of the head increases substantially, when they reach the region of the inner ends of the weakened portion 19 and the annular shoulder 23, where the shell becomes stronger and much more resistant to rupture and deformation. In addition, the part of the wood 11 surrounding the legs 37, which has been compressed by the legs as they are forced outwardly, resists further outward movement of the legs, which in turn resists further movement of the stem head along the shell. As the tension applied to the stem pulling portion 26 by the rivet placing tool continues to increase, the stem fractures at the breakneck 27, which is by then located inside the shell head 18. The rivet is thus anchored in the softwood panel 11 by means of the outwardly deformed legs 37 which are embedded in the material of the wood, as illustrated in FIG. 5.

The stem head and plugging portion are retained within the shell by the interference of the enlarged retaining portion 33 with the adjacent part of the shell shank. The presence of the stem head in abutment with the deformed legs 37 of the shell tail restrains the legs against inward collapse, which would weaken the strength of the riveted joint.

It should be noted that the major anchoring deformation of the legs 37 is spaced well away from the surface of the softwood panel 11 which is in contact with the frame member 12, so that there is plenty of wood material undisturbed adjacent the wall of the hole 35 to be strong enough to resist pull-out of the rivet. This resistance would be reduced by any substantial radial expansion of the part of the shell shank between the legs 37 and the shell head 18, since the amount of material of the softwood which resists pull-out of the expanded legs would be reduced. Any slight expansion of the exterior of the shell shank nearest the weakened portion due to the insertion of the stem retaining portion 33 into the shell bore part 20, has occurred on assembly of the rivet, before it is inserted in the hole 35 in the wood. Any axial extension of this slight expansion, when the rivet is installed, has a negligible effect on the resistance to pull-out of the rivet offered by the wood. The disruption of he wood by the legs is also spaced well away from the remote face 36 of the wood panel, thus ensuring that this face is not disturbed.

It is found that, if the hole 35 is rather shorter than is recommended, so that the stem head end face 30 touches the bottom of the hole and the shell head underface cannot initially touch the frame 12, the action of the legs 37 when the rivet is installed pulls the rivet shell head 18 into contact with the frame 12. This action can also pull the frame into tight contact with the soft wood panel 11.

It is also found that there is a substantial tolerance in the diameter of the hole 35 in which the installed rivet will still have a substantial resistance to pull-out.

The invention is not restricted to the details of the foregoing example. For instance, the stem head 29 may be formed without the parallel portion 31, the domed end face 30 being directly adjacent the wider end of the underhead curved face 32.

The cutting elements provided in the foregoing example by edges 24, could be provided in any convenient form.

Retention of the stem into the shell of the installed rivet may be achieved by providing a more positive interference between these two parts, e.g. by providing grooves on the stem in which the shell engages.

We claim:

1. A blind rivet for anchoring in relatively soft material, which rivet comprises a tubular shell and a stem;

the tubular shell having a shank and a preformed head at one end of the shank, the shank having a main part adjacent to the performed head and a weakened expandable portion of the shank at the end thereof remote from the head, the weakened portion of the shell having a thinner wall than the next adjacent portion of the shell;

the stem extending through the tubular shell, the stem having a pulling portion, a breakneck, and an expander head adjacent the expandable portion of the shell, the expander head having a maximum external diameter greater than the internal diameter of the thinner wall portion of the shell; wherein the expander head has a plurality of cutting elements on that side of the head which faces towards the weakened portion of the shell; at least part of the expander head increases in diametral dimension towards the maximum diameter of the head; and the main part of the shank is more resistant to rupture and deformation than the weakened portion;

such that, when the rivet is inserted into a bore in a body of relatively soft material so that the expandable portion of the shell is located in the bore spaced by a sufficient distance from the surface of the material at the accessible end of the bore, and increasing tension is applied to the stem on the side of the breakneck remote from the stem head, with respect to the head of the shell, firstly the stem head progressively enters the weakened portion of the shell, the cutting elements causing the weakened portion of the shell to split into a plurality of legs, the progressively increasing diametral dimension of the head causing the legs to be forced outwardly into the body of relatively soft material to anchor the rivet therein, and thereafter the stem breakneck fractures before the stem head can advance substantially further into the shell beyond the weakened portion, thereby confining the splitting of the shell into radially expanded legs embedded in the material at the end of the shell spaced away from the surface of the material at the accessible end of the bore, with no substantial expansion of at least the major part of the remaining length of the shell shank.

2. A rivet as claimed in claim 1, in which the weakened portion of the shell has the same external diameter as the next adjacent part of the shell.

3. A rivet as claimed in claim 2, in which the inner end of the weakened portion meets the next adjacent part of the shell at an annular shoulder.

4. A rivet as claimed in claim 1, in which the shell shank has a uniform external diameter.

5. A rivet as claimed in claim 1, in which the cutting elements on the stem head comprise cutting edges.

6. A rivet as claimed in claim 5, in which the cutting edges each comprise at least a part which slopes radially outwardly.

7. A rivet as claimed in claim 6, in which the cutting edges each comprise a further part which is parallel to the stem axis.

8. A rivet as claimed in claim 1, in which the shape of the stem head progressively increases as aforesaid from the diameter of the adjacent part of the cutting elements to the maximum diameter of the head.

9. A rivet as claimed in claim 8, in which the shape of the stem head progressively increases in diameter as aforesaid in a smooth arcuate curve.

10. A rivet as claimed in claim 1, in which it includes means for retaining the stem head in engagement with the outwardly deformed legs to restrain them against subsequent inwards collapse.

11. A rivet as claimed in claim 10, in which the retaining means is provided by part of the stem which has a diameter greater than the initial diameter of the part of the shell bore into which it has been drawn.

12. A rivet as claimed in claim 10, in which the retaining means part of the stem of greater diameter extends up to or substantially up to the breakneck.

13. A rivet as claimed in claim 12, in which the retaining means part of the stem is joined to the breakneck by a taper.

* * * * *